United States Patent
Serrano et al.

(10) Patent No.: US 9,473,579 B2
(45) Date of Patent: Oct. 18, 2016

(54) CONTROL OF VEHICLE COMMUNICATION USING TWO PROTOCOLS

(71) Applicant: Bayerische Motoren Werke Aktiengesellschaft, Munich (DE)

(72) Inventors: David Gozalvez Serrano, Munich (DE); Oliver Klemp, Munich (DE); Hyung-Taek Lim, Munich (DE); Markus Strassberger, Wartenberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 58 days.

(21) Appl. No.: 14/447,065

(22) Filed: Jul. 30, 2014

(65) Prior Publication Data
US 2015/0038091 A1 Feb. 5, 2015

(30) Foreign Application Priority Data
Jul. 31, 2013 (DE) .......................... 10 2013 214 946

(51) Int. Cl.
| | |
|---|---|
| H04B 7/26 | (2006.01) |
| H04W 4/04 | (2009.01) |
| H04W 88/06 | (2009.01) |
| H04L 29/08 | (2006.01) |
| H04W 24/10 | (2009.01) |
| H04L 29/06 | (2006.01) |

(52) U.S. Cl.
CPC ............... *H04L 67/12* (2013.01); *H04B 7/26* (2013.01); *H04L 69/08* (2013.01); *H04W 4/046* (2013.01); *H04W 24/10* (2013.01); *H04W 88/06* (2013.01)

(58) Field of Classification Search
None
See application file for complete search history.

(56) References Cited

U.S. PATENT DOCUMENTS

| | | | | |
|---|---|---|---|---|
| 2012/0309425 | A1* | 12/2012 | El Khayat | H04L 67/18 455/456.3 |
| 2014/0098664 | A1* | 4/2014 | Mizuguchi | G08G 1/096716 370/230 |

FOREIGN PATENT DOCUMENTS

WO    WO 2012/159684 A1    11/2012

OTHER PUBLICATIONS

German Search Report dated Feb. 3, 2014 with partial English translation (nine pages).

* cited by examiner

*Primary Examiner* — Philip Sobutka
(74) *Attorney, Agent, or Firm* — Crowell & Moring LLP

(57) ABSTRACT

A communication device for a vehicle has a first communication unit and a second communication unit. The first communication unit is configured to communicate with a server via a first communication protocol. The second communication unit is configured to communicate with at least one further vehicle via a second communication protocol. The first communication unit is configured to receive from the server control information for the second communication protocol and to forward it to the second communication unit. The second communication unit is configured to perform, depending on the forwarded control information, at least one predetermined setting for communicating with the at least one further vehicle by use of the second communication protocol.

18 Claims, 1 Drawing Sheet

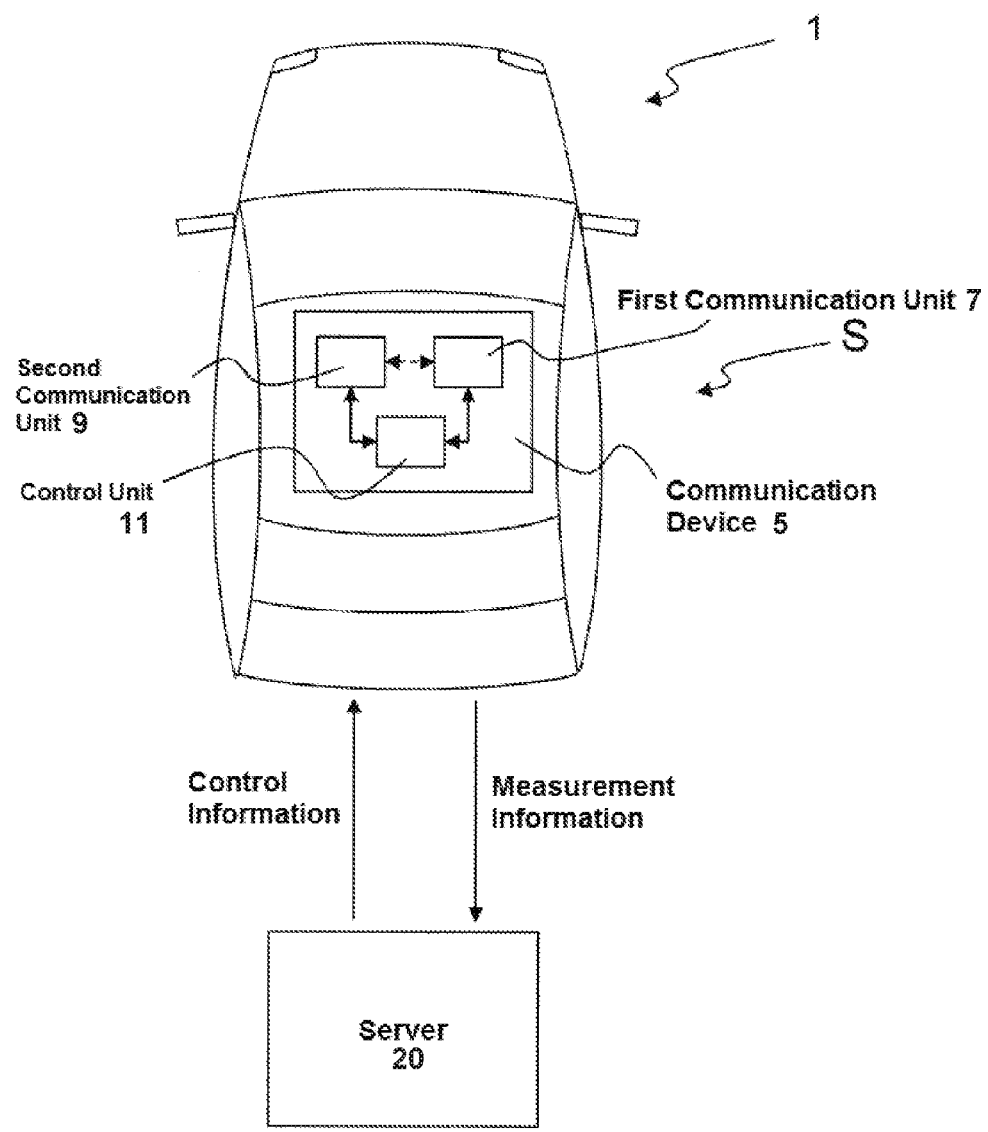

CONTROL OF VEHICLE COMMUNICATION USING TWO PROTOCOLS

CROSS REFERENCE TO RELATED APPLICATIONS

This application claims priority under 35 U.S.C. §119 from German Patent Application No 10 2013 214 946.8, filed Jul. 31, 2013, the entire disclosure of which is herein expressly incorporated by reference.

BACKGROUND AND SUMMARY OF THE INVENTION

The invention relates to a communication device for a vehicle. The invention further relates to a system including the communication device for a vehicle.

Vehicles often have a communication device, for example for vehicle-to-vehicle communication. Settings for a communication are often determined automatically by this communication device, for example by means of the Decentralized Control Mechanism (DCC), in which the settings are determined automatically by observing a channel load, for example based on the standard "Intelligent Transport System (ITS); Decentralized Congestion Control Mechanisms for Intelligent Transport Systems operating in the 5 GHz range; Access layer part, ETSI Technical Specification TS 102 687", in particular rev. 1.1.1, 2011. This can result in delays during transmission of information from the communication device to another vehicle, specifically if many vehicles are located within one transmission range.

An object underlying the invention is to provide a communication device by which fast and robust vehicle-to-vehicle communication is enabled.

Another object underlying the invention is to provide a system by which a fast and robust vehicle-to-vehicle communication is enabled.

This and other objects are achieved by a communication device for a vehicle, and a system including the communication device. The communication device for a vehicle has a first communication unit that is configured to communicate with a server via a first communication protocol. The communication device has a second communication unit that is configured to communicate with at least one further vehicle via a second communication protocol. The first communication unit is configured to receive from the server control information for the second communication protocol and to forward it to the second communication unit. The second communication unit is configured to carry out, depending on the forwarded control information, at least one predetermined setting for communicating with the at least one further vehicle by the second communication protocol.

The first communication protocol is, in particular, a cellular mobile radio communication protocol. The second communication protocol is, in particular, a communication protocol for a wireless local network (WLAN), for example according to an IEEE 802.11 standard.

Such a communication device is used, for example, for a so-called Cooperative Transport System (C-ITS). Here, messages are exchanged between vehicles so as to improve traffic safety, traffic efficiency or further objects, for example. Such a C-ITS is, for example, the European system for C-ITS (ETSI ITS-G5) and/or the American system for C-ITS Wireless Access Vehicular Environments (WAVE). The C-ITS is based, for example, on the standard "Intelligent Transport Systems (ITS); Vehicular Communications; Basic Set of Applications; Definitions, ETSI Technical Report TR 102 638", in particular rev. 1.1.1, 2009.

The control information includes, in particular, a setting within the scope of the Enhanced Distributed Channel Access Protocol (EDCA-Protocol), in particular based on the standard IEEE 802.11e, such as, for example, the standard "IEEE Standard for Information technology—Telecommunications and information exchange between systems Local and metropolitan area networks—Part 11: Wireless LAN Medium Access Control (MAC) and Physical Layer (PHY) Specifications, IEEE Standard, 2012". In the case of the EDCA protocol, different priorities can be given for different data. Through this, important data packets can get a better chance to be sent since higher prioritized traffic on average has less waiting time before the packet is allowed to be sent. For example, the EDCA protocol utilizes Carrier Sense Multiple Access CSMA with Collision Avoidance CSMA/CA, for example according to the standard "IEEE Standard for Information technology—Telecommunications and information exchange between systems Local and metropolitan area networks—Part 11: Wireless LAN Medium Access Control (MAC) and Physical Layer (PHY) Specifications, IEEE Standard, 2012". Local and metropolitan area networks—Part 11: Wireless LAN Medium Access Control (MAC) and Physical Layer (PHY) Specifications, IEEE Standard, 2012". CSMA designates a centralized asynchronous method for obtaining the access right according to the contention method, in this connection to a radio channel. CSMA/CA is a principle for collision avoidance if a plurality of communication devices have access to the same transmission channel.

The control information includes, for example, a transmitter power output, a periodicity of a broadcast message, a carrier sense range and/or a channel assignment.

The server, for example, is a backend server that is able to communicate with the vehicle. The backend server is characterized, for example, in that it is able to receive current data, for example from a plurality of vehicles. Furthermore, the backend server is also characterized, for example, in that it is able to retrieve, store and/or use historical data from external sources. In this manner, the control information can be easily acquired by the backend server and can be provided to the vehicle or the communication device.

The predetermined setting, for example, is a setting for data transmission such as a transmitter power output, a periodicity of a broadcast message, a carrier sense range and/or a channel setting.

By the server providing the control information to the second communication unit, the second communication unit can use the control information for carrying out the predetermined setting for communicating with the at least one further vehicle by way of the second communication protocol. Thus, the second communication unit does not have to determine this setting by itself by way of measurements, for example via DCC, which can potentially become unreliable. Thus, fast and robust vehicle-to-vehicle communication can be enabled by way of the second communication unit and the second communication protocol.

According to an advantageous configuration, the second communication unit is configured to prepare measurement information on the second communication protocol and to forward it to the first communication unit. The first communication unit is configured to receive the measurement information forwarded by the second communication unit and to send it to the server.

The measurement information includes, for example, information that was received from another vehicle such as, for example, position information from the other vehicle. Alternatively or additionally, the measurement information includes information on a channel load from a channel measurement. Through this, the server can receive the measurement information that can optionally be used by the server to determine the control information.

According to another advantageous configuration, the measurement information includes channel measurement information that has been determined by the second communication unit by way of a channel measurement.

Specifically through a channel measurement, a variety of information such as, for example, information on a channel load, can be determined quickly and effectively. Through this, the server can receive the measurement information that can optionally be used by the server to determine the control information.

According to another advantageous configuration, the communication device has a control unit that is configured to receive the control information for the second communication protocol, which control information is forwarded by the first communication unit, and to forward it to the second communication unit.

Through this, the control information can be transferred in a very simple manner from the first communication unit to the second communication unit without the need, for example, of adapting an interface of the first communication unit to an interface of the second communication unit.

According to another advantageous configuration, the control unit is configured to receive the measurement information that was transferred by the second communication unit and to transfer it to the first communication unit.

Through this, the measurement information can be forwarded in a very simple manner from the second communication unit to the first communication unit without the need, for example, of adapting an interface of the second communication unit to an interface of the first communication unit.

According to another advantageous configuration, the second communication protocol is based on the IEEE 802.11p standard.

For example, the ETSI-ITS-G5 and WAVE operate in a frequency range of 5.9 GHz and are based on the IEEE 802.11p standard. The IEEE 802.11p standard defines the physical layer and the Medium Access Control (MAC) layer based on other standards for WLAN. Thus, the physical layer of the IEEE 802.11p standard is based, for example, on the Orthogonal Frequency Division Multiplexing (OFDM) of the IEEE 802.11a standard, with some modifications. The OFDM is a modulation method which uses a plurality of orthogonal carriers for digital data transmission, wherein by the orthogonality of the carriers that are modulated on adjacent carriers, cross-talk between signals is reduced. Another explanation on OFDM can be found, for example, in "L. Litwin and M. Pugel, "The principles of OFDM" Rf Design, no. 1 pp. 30-48, 2001". The MAC layer of the IEEE 802.11p standard is based, for example, on the EDCA protocol of the IEEE 802.11e standard. Thus, based on the IEEE 802.11p standard, a very reliable communication, in particular for a vehicle-to-vehicle communication, can be achieved by way of the second communication protocol.

According to another advantageous configuration, the first communication protocol is based on a standard of the $3^{rd}$ Generation Partnership Project (3GPP).

The first communication protocol is based, for example, on the mobile radio standard Global System for Mobile communications (GSM). GSM is a mobile radio standard for all-digital mobile radio networks that can be used, for example, for packet-switched data transmission. Another explanation for GSM can be found, for example, in "M. Saily, G. Sebire, and E. Riddington, GSM/EDGE Evolution and Performance. John Wiley & Sons Ltd, 2010". The first communication protocol is alternatively based, for example, on the mobile radio standard Universal Mobile Telecommunications System (UMTS). UMTS differs from GSM mainly in a new radio access technology by which higher transmission rates are possible compared to GSM. Moreover, in the case of UMTS, the first communication unit is able to send and/or receive a plurality of data streams at the same time. Another explanation on UMTS can be found, for example, in "H. Holma and A. Toskala, HSDPA/HSUPA for UMTS: High Speed Radio Access for Mobile Communications. John Wiley & Sons Ltd, 2006". The first communication protocol is alternatively based, for example, on the mobile radio standard Long Term Evolution (LTE). LTE is based on UMTS; however, it achieves significantly higher download rates of up to 300 megabit per second. Another explanation on LTE can be found, for example, in "H. Holma and A. Toskala, LTE for UMTS—OFDMA and SC—FDMA Based Radio Access. John Wiley & Sons Ltd, 2011". Thus, by use of the second communication protocol based on the standard of the 3GPP, a very reliable and fast communication, in particular for a vehicle-to-vehicle communication, can be achieved.

According to another advantageous configuration, the control information includes synchronization information. Specifically for implementing a mechanism such as Self-Organized Time Division Multiple Access (STDMA), it is advantageous if the control information includes synchronization information. In the case of STDMA, channels are divided into frames that are divided into a number of time windows. The communication devices, one after the other, utilize the time window that has been assigned to them. Another explanation on STDMA can be found, for example, in "K. S. Bilstrup, E. Uhlemann, E. Strom and U. Bilstrup, "On the ability of the 802.11p MAC method and STDMA to support real-time vehicle-to-vehicle communication," EURASIP Journal on Wireless Communications and Networking, vol. 2009, Article ID 902414, 13 pages, 2009". In the case of STDMA, these time windows are normally assigned without a central unit, such as the server, by way of time synchronization. For the time synchronization, time information is often used that is provided by a global navigation satellite system (GNSS) such as, for example, by means of Global Positioning Service (GPS). However, since due to interferences, for example caused by tunnels or buildings, it is not always possible to provide the time information by means of the GNSS in a reliable manner, the synchronization information may include said time information, as a result of which reliable synchronization is enabled.

The system comprises, in particular, the server, in addition to the communication device.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 is a schematic block diagram of a system comprising a communication device and a server.

DETAILED DESCRIPTION OF THE DRAWING

FIG. 1 shows a system S. The system S includes a communication device 5 for a vehicle 1. The communication device 5 is fixedly installed in the vehicle 1, for example.

The communication device 5 has a first communication unit 7 that is configured to communicate with a server 20 via a first communication protocol. The first communication protocol is based, for example, on a standard of the 3GPP such as, for example, GMS, UMTS or LTE.

The first communication unit 7 includes, for example, an arithmetic unit (processor), a program and data storage, and a first and a second interface of the first communication unit 7. The arithmetic unit and/or the program and data storage of the first communication unit 7 can be designed to be provided in one unit or can be provided distributed over a plurality of units. The first interface of the first communication unit 7 is provided, for example, for communication with the server 20. The second interface of the first communication unit 7 is provided, for example, for communication with a second communication unit 9 and/or a control unit 11, which is explained in greater detail hereinafter.

The server 20 is, in particular, configured to communicate with a plurality of communication devices 5 of respective vehicles 1 in order to send respective data to the communication devices 5 of the respective vehicles 1 and/or to receive data from them. The server 20, for example, is a backend server that is able to communicate with the vehicle 1. The backend server is characterized, for example, in that it can obtain current data, for example, from a plurality of vehicles. The backend server is further characterized in that it can retrieve, store and/or use historical data from external sources.

The communication device 5 includes the second communication unit 9. The second communication unit 9 is configured to communicate with at least one further vehicle by way of a second communication protocol. The second communication protocol is based, for example, on the IEEE 802.11p standard.

The second communication unit 9 includes, for example, an arithmetic unit (processor), a program and data storage, and a first and a second interface of the second communication unit 9. The arithmetic unit and/or the program and data storage of the second communication unit 9 can be designed to be provided in one unit or can also be provided distributed over a plurality of units. The first interface of the second communication unit 9 is provided, for example, for communication with a further vehicle. The second interface of the second communication unit 9 is provided, for example, for communication with the first communication unit 7 and/or with the control unit 11.

The communication device 5 also includes the control unit 11, for example. The control unit 11 includes, for example, an arithmetic unit (processor), a program and data storage and a first and a second interface of the control unit 11. The arithmetic unit and/or the program and data storage of the control unit 11 can be designed to be provided in one unit or can also be provided distributed over a plurality of units. The first interface of the control unit 11 is provided, for example, for communication with the first communication unit 7. The second interface of the control unit 11 is provided, for example, for communication with the second communication unit 9.

The first communication unit 7, the second communication unit 9 and/or the control unit 11 can be designed to be provided in one unit or can also be provided to be distributed over a plurality of units.

The first communication unit 7 is configured to receive from the server 20 control information SI for the second communication protocol and to forward it to the second communication unit 9. The control information SI includes, for example, a setting within the framework of the EDCA protocol, in particular based on the IEEE 802.11w standard. Alternatively or additionally, the control information SI includes a transmitter power output, periodicity of a broadcast message, a carrier sense range and/or a channel assignment. Alternatively or additionally, the control information SI includes synchronization information, for example, for STDMA. The synchronization information includes time information, for example.

For example, for this purpose, the first communication unit 7 is configured to send the control information received from the server 20 to the control unit 11. The control unit 11 is configured here to receive the control information SI for the second communication protocol forwarded by the first communication unit 7 and to send it to the second communication unit 9. Alternatively, the first communication unit 7 is configured to send the control information SI, for example, directly to the second communication unit 9.

The second communication unit 9 is configured to perform, depending on the forwarded control information SI, at least one predetermined setting for communicating with the at least one further vehicle by use of the second communication protocol. The predetermined setting, for example, is a setting for data transmission such as, for example, a transmitter power output, periodicity of a broadcast message, a carrier sense range and/or a channel setting.

The second communication unit 9, for example, is in addition configured to prepare measurement information MI on the second communication protocol and to forward it to the first communication unit 7. The measurement information MI includes, for example, information received from another vehicle such as, for example, position information from the other vehicle. Alternatively or additionally, the measurement information MI includes, for example, information on a channel load from a channel measurement. For this, for example, the second communication unit 9 sends the measurement information MI to the control unit 11. For this, the control unit 11 is configured, for example, to receive the measurement information MI, which was sent by the second communication unit 9, and to forward it to the first communication unit 7. Alternatively, the second communication unit 9 can also send the measurement information directly to the first communication unit 7. The first communication unit 7 is configured to receive the measurement information MI forwarded by the second communication unit 9 and to send it to the server 20.

With the illustrated approach, the control information SI can be provided by the server 20 to the second communication unit 9 so that the latter can use this control information SI in order to perform the predetermined setting for communicating with the at least one further vehicle by use of the second communication protocol. The control information SI, for example, can be determined by the server 20 by the measurement information MI. Thus, for example, the second communication unit 9 no longer needs to determine this setting by itself through measurements, for instance by way of DCC, which can become unreliable in some cases. Thus, fast and robust vehicle-to-vehicle communication can be enabled by use of the second communication unit 9 and the second communication protocol.

REFERENCE LIST

1 Vehicle
5 Communication device

7 First communication unit
9 Second communication unit
11 Control unit
20 Server
S System
SI Control information
MI Measurement information The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A communication device for a vehicle that communicates with a server, comprising:
    a first communication unit configured to communicate with the server via a first communication protocol, the first communication unit comprising a first interface for establishing the communication between the first communication unit and the server;
    a second communication unit configured to communicate with at least one further vehicle via a second communication protocol, the second communication unit comprising a second interface for establishing the communication between the second communication unit and the at least one further vehicle, wherein
        the first communication unit is configured to receive control information from the server for the second communication protocol, and to forward the control information to the second communication unit, and
        the second communication unit is configured to perform, depending on the forwarded control information, at least one predetermined setting for communicating with the at least one further vehicle by way of the second communication protocol.

2. The communication device according to claim 1, wherein
    the second communication unit is configured to prepare measurement information on the second communication protocol and to forward the measurement information to the first communication unit, and
    the first communication unit is configured to receive the measurement information forwarded by the second communication unit and to send the measurement information to the server.

3. The communication device according to claim 2, wherein
    the measurement information comprises channel measurement information which has been determined by the second communication unit by a channel measurement.

4. The communication device according to claim 3, further comprising:
    a control unit configured to receive the control information for the second communication protocol forwarded by the first communication unit and to forward the control information to the second communication unit.

5. The communication device according to claim 4, wherein
    the control unit is configured to receive the measurement information which has been forwarded by the second communication unit and to forward the measurement information to the first communication unit.

6. The communication device according to claim 1, further comprising:
    a control unit configured to receive the control information for the second communication protocol forwarded by the first communication unit and to forward the control information to the second communication unit.

7. The communication device according to claim 1, wherein
    the second communication protocol is based on the IEEE 802.11p standard.

8. The communication device according to claim 7, wherein
    the first communication protocol is based on a standard of the $3^{rd}$ Generation Partnership Project.

9. The communication device according to claim 8, wherein
    the control information comprises synchronization information.

10. The communication device according to claim 1, wherein
    the first communication protocol is based on a standard of the $3^1$ Generation Partnership Project.

11. The communication device according to claim 1, wherein
    the control information comprises synchronization information.

12. A system for use with a vehicle, comprising:
    a server;
    a communication device installed in the vehicle, the communication device comprising:
        a first communication unit configured to communicate with the server via a first communication protocol, the first communication unit comprising a first interface for establishing the communication between the first communication unit and the server;
        a second communication unit configured to communicate with at least one further vehicle via a second communication protocol, the second communication unit comprising a second interface for establishing the communication between the second communication unit and the at least one further vehicle, wherein
            the first communication unit is configured to receive control information from the server for the second communication protocol, and to forward the control information to the second communication unit, and
            the second communication unit is configured to perform, depending on the forwarded control information, at least one predetermined setting for communicating with the at least one further vehicle by way of the second communication protocol.

13. The system according to claim 12, wherein
    the second communication unit is configured to prepare measurement information on the second communication protocol and to forward the measurement information to the first communication unit, and
    the first communication unit is configured to receive the measurement information forwarded by the second communication unit and to send the measurement information to the server.

14. The system according to claim 13, wherein
    the measurement information comprises channel measurement information which has been determined by the second communication unit by a channel measurement.

15. The system according to claim 14, further comprising:
    a control unit configured to receive the control information for the second communication protocol forwarded by the first communication unit and to forward the control information to the second communication unit.

16. The system according to claim 15, wherein
the control unit is configured to receive the measurement information which has been forwarded by the second communication unit and to forward the measurement information to the first communication unit.

17. The system according to claim 16, wherein
the first communication protocol is based on a standard of the 3$^{rd}$ Generation Partnership Project.

18. The system according to claim 17, wherein
the control information comprises synchronization information.

\* \* \* \* \*